(12) United States Patent
Glugla et al.

(10) Patent No.: US 6,389,806 B1
(45) Date of Patent: May 21, 2002

(54) VARIABLE DISPLACEMENT ENGINE CONTROL FOR FAST CATALYST LIGHT-OFF

(75) Inventors: Christopher P. Glugla, Macomb; John Ottavio Michelini, Sterling Heights, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/732,347

(22) Filed: Dec. 7, 2000

(51) Int. Cl.⁷ .................................................. F01N 3/00
(52) U.S. Cl. .............................. 60/284; 60/274; 60/285; 123/697
(58) Field of Search .......................... 60/274, 276, 284, 60/285, 286; 123/692, 697

(56) References Cited

U.S. PATENT DOCUMENTS

| | | | |
|---|---|---|---|
| 4,134,261 A | * 1/1979 | Iizuka et al. .................. 60/285 |
| 4,165,610 A | * 8/1979 | Iizuka et al. .................. 60/284 |
| 4,274,373 A | * 6/1981 | Sugasawa et al. ........... 123/692 |
| 4,467,602 A | 8/1984 | Iizuka et al. |
| 5,437,253 A | 8/1995 | Huffmaster et al. |
| 5,460,129 A | 10/1995 | Miller et al. |
| 5,462,038 A | * 10/1995 | Kotwicki et al. ............ 123/692 |
| 5,490,486 A | 2/1996 | Diggs |
| 5,497,745 A | 3/1996 | Cullen et al. |
| 5,540,202 A | 7/1996 | Cullen et al. |
| 5,600,947 A | 2/1997 | Cullen |
| 5,653,102 A | 8/1997 | Orzel et al. |
| 5,711,387 A | 1/1998 | Murata et al. |
| 5,722,236 A | 3/1998 | Cullen et al. |
| 5,758,493 A | * 6/1998 | Asik et al. ..................... 60/274 |
| 5,836,292 A | * 11/1998 | Aoki .......................... 123/697 |
| 5,956,941 A | 9/1999 | Cullen et al. |
| 5,970,943 A | 10/1999 | Robichaux et al. |
| 6,023,929 A | * 2/2000 | Ma .............................. 60/285 |
| 6,164,065 A | * 12/2000 | Denari et al. .................. 60/284 |
| 6,205,776 B1 | * 3/2001 | Otsuka ......................... 60/284 |
| 6,237,327 B1 | * 5/2001 | Nishimura et al. ........... 60/284 |
| 6,237,330 B1 | * 5/2001 | Takahashi et al. ............. 60/285 |
| 2001/0015065 A1 | * 8/2001 | Ide ............................... 60/285 |

* cited by examiner

Primary Examiner—Thomas Denion
Assistant Examiner—Tu M. Nguyen
(74) Attorney, Agent, or Firm—John D. Russell; Allan J. Lippa

(57) ABSTRACT

A system and method for controlling a variable displacement engine include starting the engine with at least one bank of cylinders deactivated to increase load on at least one other bank of activated cylinders and reduce time required for an engine and/or vehicle component to reach a desired operating temperature. In one embodiment, ignition timing or spark is retarded and air/fuel ratio is biased lean for the activated cylinder bank during and shortly after starting to further reduce the time required for catalyst light off and closed loop operation. During activation of a deactivated bank of cylinders, air/fuel ratio of one or more activated cylinders is biased rich with air/fuel ratio of the deactivated cylinders biased lean. In addition, spark is retarded during activation of the deactivated cylinders to reduce the time necessary for components associated with the deactivated cylinders to reach desired operating temperatures.

25 Claims, 4 Drawing Sheets

… … …

VARIABLE DISPLACEMENT ENGINE CONTROL FOR FAST CATALYST LIGHT-OFF

BACKGROUND OF THE INVENTION

1. Field of the Invention

The present invention relates to a system and method for controlling a multi-cylinder internal combustion engine operable in a variable displacement mode to reduce the time required for a catalyst to reach a desired operating efficiency.

2. Background Art

Fuel economy for a multi-cylinder internal combustion engine can be improved by deactivating some of the engine cylinders under certain operating conditions. Reducing the number of operating cylinders reduces the effective displacement of the engine such that it is sometimes referred to as a variable displacement engine. Mechanisms which reduce the effective stroke of one or more cylinders may also be used to provide a variable displacement mode of operation. Depending upon the particular configuration of the variable displacement engine, one or more cylinders may be selectively deactivated to improve fuel economy under light load conditions, for example. In some engine configurations, a group of cylinders, which may be an entire bank of cylinders, is selectively activated and deactivated.

Reducing the effective displacement by reducing the number of operating cylinders may also reduce the operating temperature of various engine and/or vehicle components which may adversely affect desired engine control or operation. For example, emission control devices, such as catalytic converters, and associated exhaust gas oxygen (EGO) sensors require a minimum operating temperature to function as desired. In the case of some EGO sensors, a reliable indication of oxygen content (or air/fuel ratio) which may be used for more efficient closed loop control of the engine requires a minimum operating temperature. Likewise, emission control devices having catalysts require a minimum operating temperature for efficient operation. For variable displacement engines configured to selectively operate an entire bank of cylinders, sensors and catalysts associated with the deactivated bank may cool below the desired operating temperature. Likewise, emission control devices and related sensors require some period of time after a cold start to operate efficiently. It is desirable to minimize the time required for these components to reach associated desired operating temperatures after starting the engine.

SUMMARY OF THE INVENTION

An object of the present invention is to provide a system and method for controlling an engine operable in a variable displacement mode during and shortly after starting to reduce the time necessary for emission control devices and related sensors to reach a desired minimum operating temperature. Another object of the present invention is to reduce or eliminate the time required to achieve a desired minimum operating temperature for components associated with one or more deactivated cylinders operating in a variable displacement mode.

In carrying out the above objects and other objects, advantages, and features of the invention, a system and method for controlling an internal combustion engine having at least one bank of cylinders operable in a variable displacement mode include starting the engine with at least one bank of cylinders deactivated to increase load on at least one other bank of activated cylinders and reduce time required for an engine and/or vehicle component to reach a desired operating temperature. In one embodiment, ignition timing or spark is retarded and air/fuel ratio is operated lean for the activated cylinder bank during and shortly after starting to further reduce the time required for catalyst light off and closed loop operation. During activation of a deactivated bank of cylinders, air/fuel ratio of one or more activated cylinders is biased rich with air/fuel ratio of the deactivated cylinders biased lean. In addition, spark is retarded during activation of the deactivated cylinders to reduce the time necessary for components associated with the deactivated cylinders to reach desired operating temperatures.

The present invention provides a number of advantages. For example, the present invention controls the engine during and shortly after starting to reduce the time necessary for emission control devices to reach a desired operating efficiency. Furthermore, the present invention, reduces the time after starting or activating a deactivated bank of cylinders to operate in the more efficient closed loop mode.

The above advantage and other advantages, objects, and features of the present invention will be readily apparent from the following detailed description of the preferred embodiments when taken in connection with the accompanying drawings.

DETAILED DESCRIPTION OF THE PREFERRED EMBODIMENT(S)

Figure 1:
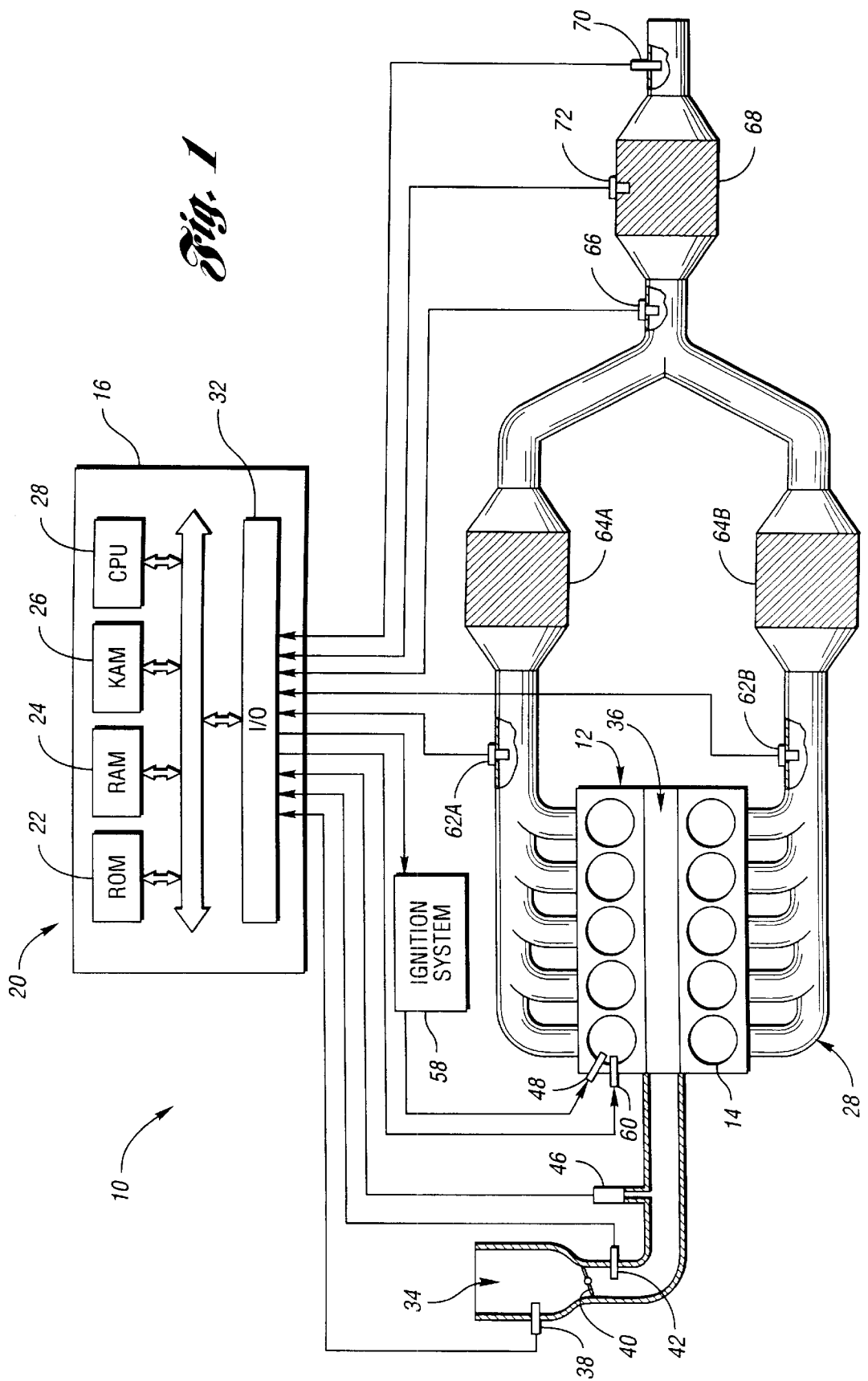
FIG. 1 is a block diagram illustrating operation of one embodiment for a system or method for controlling a variable displacement engine during starting or reactivation of deactivated cylinders according to the present invention.

A block diagram illustrating an engine control system for a representative internal combustion engine operable in a variable displacement mode to reduce the time for engine/vehicle components to achieve a desired minimum operating temperature according to the present invention is shown in FIG. 1. System 10 preferably includes an internal combustion engine 12 having a plurality of cylinders, represented by cylinder 14. In one preferred embodiment, engine 12 includes ten cylinders arranged in a "V" configuration having two cylinder banks with five cylinders each. As used herein, a cylinder bank refers to a related group of cylinders having a common characteristic, such as being located proximate one another or having a common emission control device (ECD) or exhaust manifold for example. As such, cylinder banks can also be defined for in-line cylinder configurations which are within the scope of the present invention.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor for the entire engine. However, the block diagrams of the Figures generally illustrate only a single type of sensor for ease of illustration and description.

System 10 preferably includes a controller 16 having a microprocessor 18 in communication with various computer-readable storage media, indicated generally by reference numeral 20. The computer readable storage media preferably include a read-only memory (ROM) 22, a random-access memory (RAM) 24, and a keep-alive memory (KAM) 26. As known by those of ordinary skill in the art, KAM 26 is used to store various operating variables while controller 16 is powered down but is connected to the vehicle battery. Computer-readable storage media 20 may be implemented using any of a number of known memory devices such as PROMs, EPROMS, EEPROMs, flash memory, or any other electric, magnetic, optical, or combination memory device capable of storing data, some of which represent executable instructions, used by microprocessor 18 in controlling the engine. Microprocessor 18 communicates with the various sensors and actuators via an input/output (I/O) interface 32. Of course, the present invention could utilize more than one physical controller, such as controller 16, to provide engine/vehicle control depending upon the particular application.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 16 indicative of the mass airflow. If no mass airflow sensor is present, a mass airflow value may be inferred from various engine operating parameters. A throttle valve 40 may be used to modulate the airflow through intake 34 during certain operating modes. Throttle valve 40 is preferably electronically controlled by an appropriate actuator 42 based on a corresponding throttle position signal generated by controller 16. A throttle position sensor provides a feedback signal (TP) indicative of the actual position of throttle valve 40 to controller 16 to implement closed loop control of throttle valve 40.

As illustrated in FIG. 1, a manifold absolute pressure sensor 46 may be used to provide a signal (MAP) indicative of the manifold pressure to controller 16. Air passing through intake 34 enters the combustion chambers or cylinders 14 through appropriate control of one or more intake valves. The intake and exhaust valves may be controlled directly or indirectly by controller 16 along with ignition timing (spark) and fuel to selectively activate/deactivate one or more cylinders 12 to provide variable displacement operation. Alternatively, variable displacement operation may be provided by selectively modifying the effective stroke of one or more cylinders. Variable displacement operation may be selectively used to quickly achieve a minimum operating temperature for one or more exhaust gas oxygen sensors and emission control devices during starting of the engine or during activation of cylinders after operating in the variable displacement mode according to the present invention as explained in greater detail below.

A fuel injector 48 injects an appropriate quantity of fuel in one or more injection events for the current operating mode based on a signal (FPW) generated by controller 16 processed by an appropriate driver. Control of the fuel injection events is generally based on the position of the pistons within respective cylinders 14. Position information is acquired by an appropriate crankshaft sensor which provides a position signal (PIP) indicative of crankshaft rotational position. At the appropriate time during the combustion cycle, controller 16 generates a spark signal (SA) which is processed by ignition system 58 to control spark plug 60 and initiate combustion within an associated cylinder 14.

Controller 16 (or a camshaft arrangement) controls one or more exhaust valves to exhaust the combusted air/fuel mixture of activated or running cylinders through an associated exhaust manifold, indicated generally by reference numeral 28. Depending upon the particular engine configuration, one or more exhaust manifolds may be used. In one preferred embodiment, engine 12 includes an exhaust manifold 28 associated with each bank of cylinders as illustrated in FIG. 1.

An exhaust gas oxygen sensor 62 is preferably associated with each bank of cylinders and provides a signal (EGO) indicative of the oxygen content of the exhaust gases to controller 16. As known by those of ordinary skill in the art, the EGO signal may be used as feedback in a closed loop controller to control the air/fuel ratio provided to the one or more cylinders. Closed loop operation is generally more efficient than open loop operation under similar operating conditions. However, a reliable EGO signal for use in closed loop operation generally requires the EGO sensor to be above a minimum operating temperature. As such, the present invention provides a system and method for reducing or eliminating open loop operation time during and shortly after starting the engine or activating a deactivated cylinder by appropriate engine control to quickly achieve and a desired minimum operating temperature of the exhaust gas oxygen sensor(s) and associated emission control device(s).

The present invention is independent of the particular type of emission control device and/or exhaust gas oxygen sensor utilized, which may depend on the particular application. In one embodiment, heated exhaust gas oxygen sensors (HEGO) are used in combination with a three-way catalyst. Of course, various other air/fuel ratio indicators or sensors and emission control devices may be used such as a universal exhaust gas oxygen sensor (UEGO), for example. The exhaust gas oxygen sensor signals may be used to independently adjust the air/fuel ratio, or control the operating mode of one or more cylinders or banks of cylinders. In one preferred embodiment, during activation or reactivation of a group or bank of cylinders, the air/fuel ratio is biased rich for the activated cylinders and lean for the deactivated cylinders to balance the feedgas emissions associated with each group or bank of cylinders provided to a downstream or underbody catalyst while reducing the time required for the components associated with the deactivated cylinders to reach desired operating temperatures.

Figure 2:
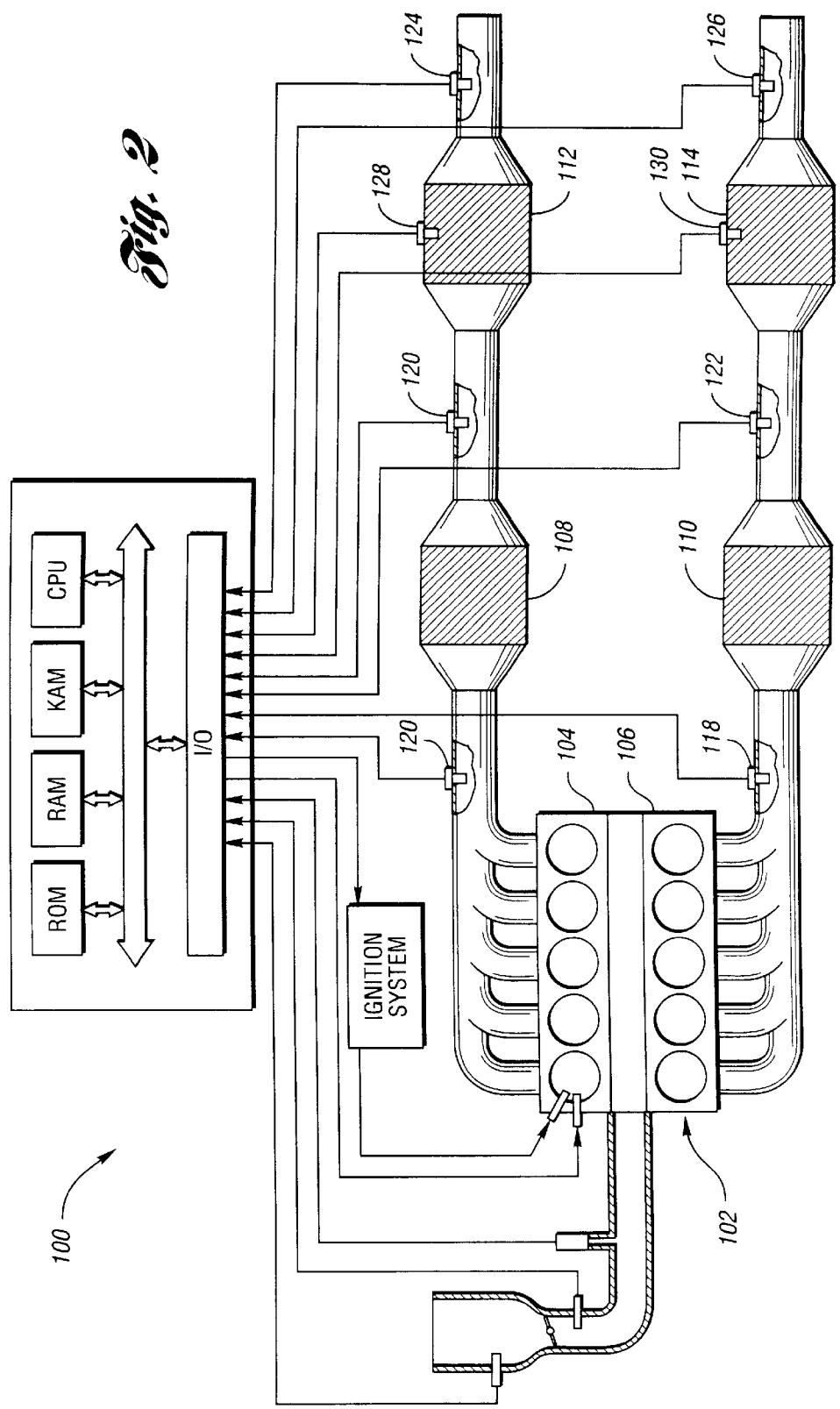
FIG. 2 is a block diagram illustrating operation of another embodiment for a system or method for controlling a variable displacement engine according to the present invention.

With continuing reference to FIG. 2, the exhaust gas passes through the exhaust manifolds 28 to associated upstream emission control devices (ECDs) 64A and 64B which may be catalytic converters, for example. After passing through the associated upstream ECDs, the exhaust gas is combined and flows past an underbody exhaust gas oxygen sensor 66 and through a downstream or underbody emission control device 68 before flowing past a catalyst monitoring sensor 70 (typically another exhaust gas oxygen sensor) and being exhausted to atmosphere.

A temperature sensor 72 may be provided to monitor the temperature of a catalyst within emission control device 68, depending upon the particular application. Alternatively, the temperature may be estimated using an appropriate temperature model based on various other sensed or estimated engine/vehicle parameters which may include mass airflow, manifold absolute pressure or load, engine speed, air temperature, engine coolant temperature, and/or engine oil temperature, for example. Likewise, temperature of exhaust gas oxygen sensors 62A, 62B and/or 66 can be measured or estimated using an appropriate model. A representative temperature model is described in U.S. Pat. No. 5,956,941, for example.

According to the present invention, controller 16 controls selective operation in the variable displacement mode for one or more cylinders to reduce the time required for catalyst light-off and closed loop control after starting the engine and activating or reactivating one or more cylinders. In a preferred embodiment, engine 12 is a V-10 engine with variable displacement operation provided by selectively deactivating one bank of cylinders under appropriate engine and/or vehicle operating conditions, such as during starting and under light load, for example. Deactivating one or more cylinders during starting increases the load on the activated or operating cylinders and provides additional heat flux to the corresponding sensors and emission control devices to more quickly attain catalyst light-off and closed loop operation. The present invention controls the engine to similarly reduce the time to attain a desired minimum operating temperature during activation of the remaining group(s) or bank(s) of cylinders after starting the engine or after operating in the variable displacement mode for a period of time where the components may cool to below the desired minimum operating temperature.

Referring now to FIG. 2, an alternative embodiment for controlling a variable displacement engine to reduce the time for catalyst light-off and/or closed loop operation according to the present invention is shown. As will be recognized by those of ordinary skill in the art, system 100 includes similar components as described with reference to the embodiment illustrated in FIG. 1 and incorporated here by reference. Internal combustion engine 102 includes two cylinder banks 104, 106. Each cylinder bank includes an associated upstream or close-coupled emission control device 108 and 110, respectively. In addition, rather than combining the exhaust and using a common third emission control device as illustrated in FIG. 1, each bank 104, 106 also has an associated downstream or underbody emission control device 112, 114, respectively. In one embodiment, the emission control devices 108, 110, 112, and 114 are three-way catalysts.

As also illustrated in FIG. 2, each ECD has an associated exhaust gas oxygen sensor 116, 118, 120, 122, respectively, which are preferably HEGO sensors. Additional exhaust gas oxygen sensors 124, 126 may be provided downstream relative to downstream ECDs 112, 114, respectively, to provide a conversion efficiency indication and monitor operation of the emission control devices. Downstream ECDs 112, 114 preferably include associated temperature sensors 128, 130 to provide an indication of the catalyst temperature which may be used to determine or estimate the temperature of associated exhaust gas oxygen sensors. It should be recognized by those of ordinary skill in the art that the temperature of the emission control devices and/or the temperature of one or more exhaust gas oxygen sensors can be modeled as described above with reference to the embodiment illustrated in FIG. 1. Sensor and emission control device temperature modeling may be used alone or in combination with one or more temperature sensors to quickly attain associated desired minimum operating temperatures according to the present invention.

Of course, one of ordinary skill in the art will recognize that a variety of engine/vehicle operating parameters influence the current operating mode and selective activation/deactivation of one or more cylinders to provide variable displacement operation. These parameters may affect or override the decision to activate/deactivate cylinders to provide the temperature control features in accordance with the present invention.

Figure 3:
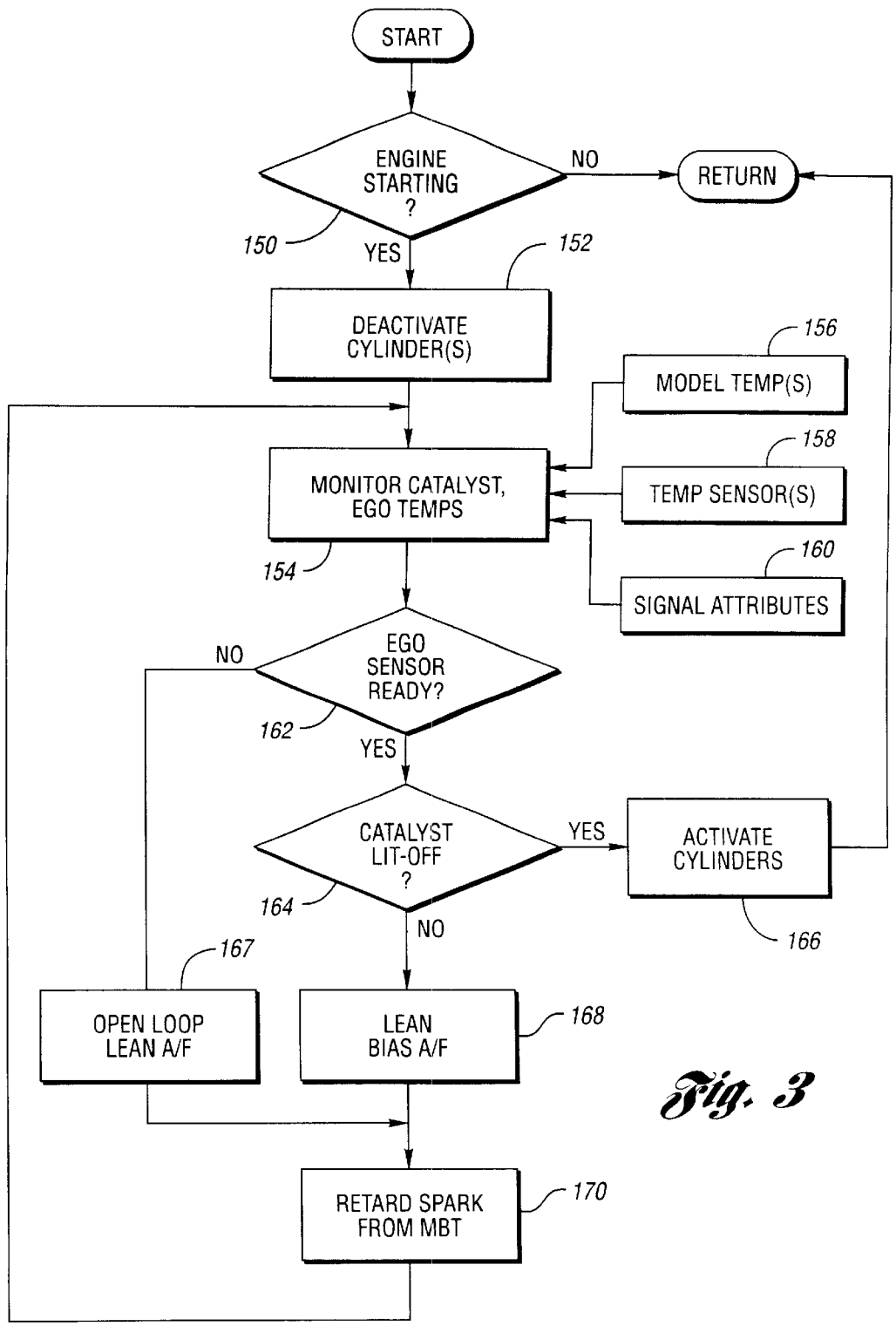
FIG. 3 is a flow diagram illustrating operation of one embodiment for a system or method for controlling a variable displacement engine during starting according to the present invention.
Figure 4:
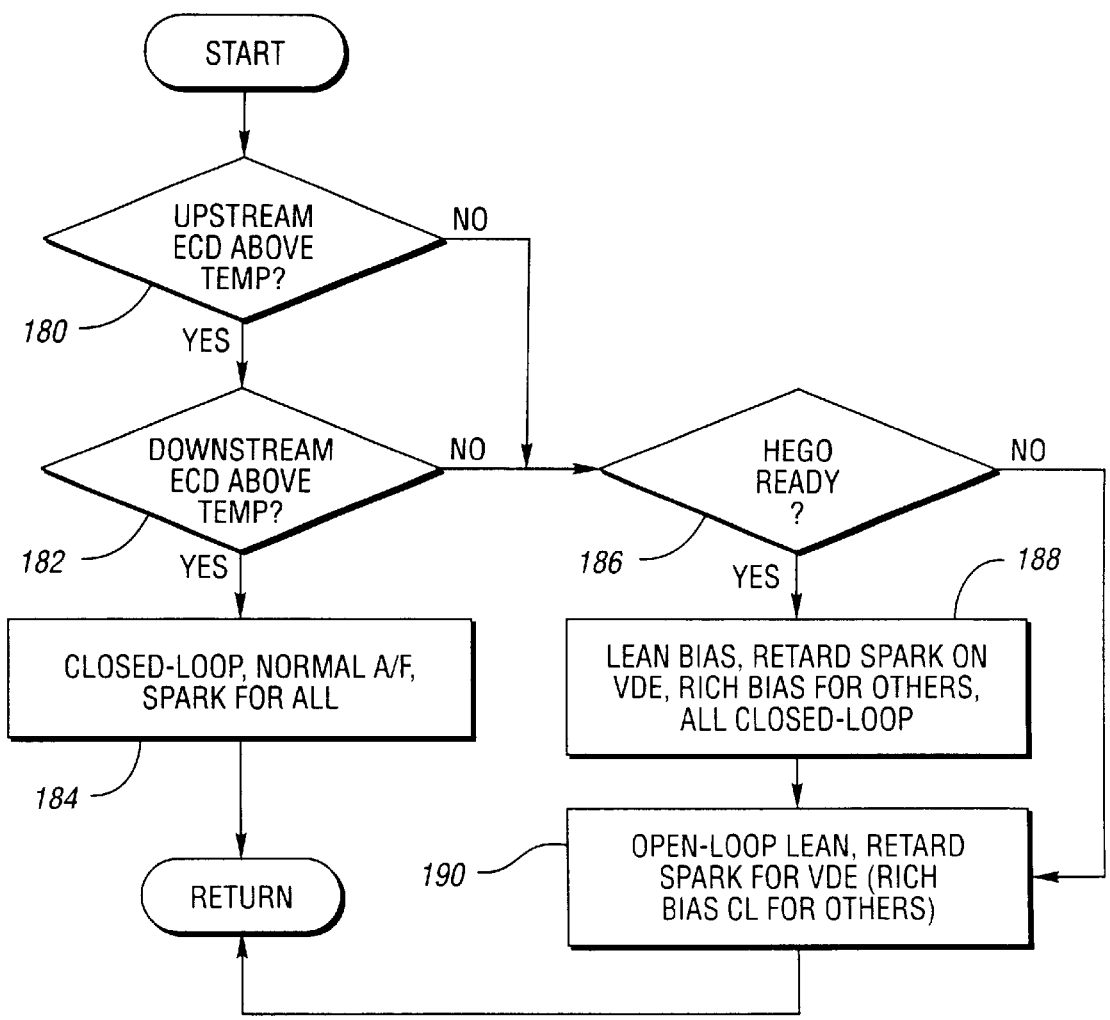
FIG. 4 is a logic diagram illustrating a reactivation strategy for cylinders of a variable displacement engine according to one embodiment of the present invention.

The diagrams of FIGS. 3 and 4 generally represent control logic for embodiments of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

A flow diagram illustrating operation of one embodiment for a system or method for controlling a variable displacement engine to reduce the time for catalyst light-off and/or closed loop operation according to the present invention is shown in FIG. 3. Block 150 determines whether the engine is being started. If the engine is starting, block 152 deactivates one or more cylinders to increase the load of the activated cylinders and reduce the time for the various components to reach a desired minimum operating temperature. In one embodiment, block 152 represents deactivation of a cylinder bank such that the close-coupled catalyst of the activated bank reaches light-off more quickly. Depending upon the particular engine configuration and operating mode, one or more groups of cylinders may be selectively deactivated in accordance with the present invention.

Block 154 represents monitoring of the associated catalyst and exhaust gas oxygen sensor temperatures for the activated cylinders. Temperatures may be determined using an appropriate model as represented by block 156. Alternatively, or in combination, temperatures for the EGO sensor(s) and/or emission control devices may be monitored using one or more associated temperature sensors as represented by block 158. Signal attributes of signals provided by the EGO sensors may also be used to provide an indication of the associated sensor temperature as represented by block 160. However, the use of the sensor signal to infer whether or not the sensor is ready is generally only valid if operating in a narrow window and modulating fuel about the stoichiometric air/fuel ratio.

Block 162 determines whether the EGO sensor has reached a desired minimum operating temperature such that it provides a reliable signal for closed-loop air/fuel ratio control. If the EGO sensor is not ready for closed-loop as determined by block 162, the engine is operated open-loop with a lean air/fuel ratio as represented by block 167. Block 164 determines whether the associated close-coupled catalyst has reached a desired minimum operating temperature corresponding to the catalyst light-off temperature, for example. If the EGO sensor is ready but the catalyst has not reached an appropriate temperature, the engine controller may operate the activated cylinders closed-loop with a lean biased air/fuel ratio as represented by block 168. In addition, emission timing or spark is preferably retarded from MBT for the activated cylinders as represented by block 170. The controller continues to monitor the associated temperatures as indicated by block 154.

Once the EGO sensor(s) and associated catalyst have reached their corresponding desired minimum operating temperatures as represented by blocks 162 and 164, additional cylinders or cylinder banks may be activated as represented by block 166. Preferably cylinder activation or reactivation is controlled according to the strategy illustrated and described with reference to FIG. 4.

FIG. 4 provides a block diagram illustrating a cylinder activation/deactivation strategy according to one embodiment of the present invention. Block 180 of FIG. 4 represents monitoring of at least one engine or vehicle component such as an emission control device (ECD). In this embodiment, block 180 determines whether an upstream or close coupled ECD is above a corresponding or associated temperature threshold. For example, the temperature threshold may correspond to the light-off temperature of a three-way catalyst. Block 182 determines whether a downstream or underbody ECD is above a corresponding temperature. The downstream ECD may be associated with a single upstream device, as illustrated in FIG. 2, or shared by multiple upstream devices as illustrated in FIG. 1. If the upstream ECD is above the corresponding temperature threshold as determined by block 180 and the downstream ECD is above its associated temperature threshold as determined by block 182, all cylinders are operated under closed-loop control with a normal scheduled air/fuel ratio and spark or ignition timing as represented by block 184.

If the upstream component is below its associated temperature threshold as indicated by block 180, or the downstream component is below its associated temperature threshold as indicated by block 182, block 186 determines whether an associated exhaust gas oxygen sensor is available for providing information sufficient to operate in closed-loop mode. In this particular embodiment, block 186 determines whether an associated HEGO sensor has reached an appropriate operating temperature to provide reliable information with respect to the oxygen content of the exhaust gas. If the associated HEGO sensor is ready for closed-loop operation as determined by block 186, the previously deactivated cylinders are activated with a lean bias on the air/fuel ratio and spark is retarded from MBT. The previously running or activated cylinders are operated with a rich bias air/fuel ratio. All cylinders are operated using closed-loop control of air/fuel ratio based on the HEGO sensor reading with appropriate lean/rich bias as represented by block 188. In one embodiment, an entire bank of cylinders is activated and operated with a lean bias and retarded spark until the downstream ECD reaches its temperature threshold as determined by block 182.

If the HEGO sensor associated with the ECD is not ready for closed-loop operation, as may occur during and shortly after a cold start, as determined by block 186, the engine is-controlled to activate the deactivated cylinders and operate them open-loop with a lean air/fuel ratio and spark retarded from MBT. The previously activated or running cylinders may be operated with a rich bias air/fuel ratio in closed-loop mode depending upon the particular exhaust configuration. For exhaust configurations as illustrated in FIG. 1, the number of cylinders operating with a lean bias during activation or deactivation preferably corresponds to the number of cylinders operating with a rich bias such that the combined feedgas emissions are near the stoichiometric ratio prior to entering the downstream or underbody catalyst.

Thus, the present invention provides a system and method for controlling a variable displacement engine to reduce the time necessary for catalyst light-off and/or closed loop operation after engine starting or operating in the variable displacement mode.

While the best mode for carrying out the invention has been described in detail, those familiar with the art to which this invention relates will recognize various alternative designs and embodiments for practicing the invention as defined by the following claims.

What is claimed:

1. A method for controlling an internal combustion engine having a plurality of cylinders, at least some of which are selectively deactivated in a variable displacement operating mode, the method comprising:

controlling the engine during starting to deactivate at least one cylinder; and biasing air/fuel ratio lean relative to stoichiometry for the activated cylinders until an exhaust gas oxygen sensor reaches a desired operating temperature for closed loop control of the engine.

2. A method for controlling an internal combustion engine having a plurality of cylinders, at least some of which are selectively deactivated in a variable displacement operating mode, the method comprising:

controlling the engine during starting to deactivate at least one cylinder;

retarding ignition timing for the activated cylinders; and biasing air/fuel ratio lean relative to stoichiometry for the activated cylinders to reduce time required for at least one engine component to reach a desired operating temperature.

3. The method of claim 1 wherein the steps of controlling and biasing are performed until a catalyst reaches light-off temperature.

4. A method for controlling an internal combustion engine having a plurality of cylinders, at least some of which are selectively deactivated in a variable displacement operating mode, the method comprising:

controlling the engine during starting to deactivate at least one cylinder;

biasing air/fuel ratio lean relative to stoichiometry for the activated cylinders; and biasing air/fuel ratio lean for at least one deactivated cylinder and biasing air/fuel ratio rich relative to a stoichiometry for the activated cylinders during activation after at least one emission control device associated with the activated cylinders has reached a desired operating temperature.

5. A method for controlling an internal combustion engine having a plurality of cylinders, at least some of which are selectively deactivated in a variable displacement operating mode, the method comprising:

deactivating at least one cylinder during starting;

biasing air/fuel ratio lean relative to stoichiometry for the activated cylinders;

activating the deactivated cylinders and controlling air/fuel ratio to the cylinders during activation to provide a lean air/fuel ratio; and controlling air/fuel ratio for a corresponding number of activated cylinders during activation of the deactivated cylinders to provide a rich air/fuel ratio.

6. The method of claim 5 further comprising retarding ignition timing for the at least one deactivated cylinder during activation.

7. A method for controlling a variable displacement internal combustion engine having cylinders grouped into first and second banks with associated separate first and second upstream emission control devices and first and second exhaust gas oxygen sensors and at least a third downstream emission control device, at least one bank being selectively activated and deactivated to provide variable displacement, the method comprising:

deactivating the second bank during and after starting until the first emission control device and first exhaust gas oxygen sensor reach associated desired operating temperatures.

8. The method of claim 7 further comprising retarding ignition timing for the first bank during and after starting.

9. The method of claim 7 further comprising biasing air/fuel ratio lean for the first bank during and after starting.

10. The method of claim 7 wherein the third downstream emission control device is a shared emission control device positioned downstream of both upstream emission control devices.

11. The method of claim 7 further comprising:

activating the second bank after the first emission control device and first exhaust gas oxygen sensor reach associated desired operating temperatures until the second emission control device and second exhaust gas oxygen sensor reach associated desired operating temperatures.

12. The method of claim 11 further comprising:

biasing air/fuel ratio rich for the first bank and lean for the second bank until the second emission control device and second exhaust gas oxygen sensor reach associated desired operating temperatures.

13. The method of claim 11 further comprising:

retarding ignition timing for the second bank until the second emission control device and second exhaust gas oxygen sensor reach associated desired operating temperatures.

14. A system for controlling an internal combustion engine having at least first and second cylinder banks, at least one of which is selectively deactivated in a variable displacement operating mode, the system comprising:

first and second upstream emission control devices;

first and second exhaust gas oxygen sensors having associated heaters and positioned downstream relative to the first and second upstream emission control devices, respectively;

at least a third emission control device positioned downstream relative to at least one of the first and second upstream emission control devices; and an engine controller for deactivating the first bank after starting the engine until the second upstream emission control device and the second exhaust gas oxygen sensor have attained minimum desired operating temperatures.

15. The system of claim 14 wherein the controller retards ignition timing for the second bank during and after starting.

16. The system of claim 14 wherein the controller biases air/fuel ratio lean for the second bank during and after starting.

17. The system of claim 14 wherein the controller:

activates the first bank after the second emission control device and second exhaust gas oxygen sensor reach associated desired operating temperatures until the first emission control device and first exhaust gas oxygen sensor reach associated desired operating temperatures.

18. The system of claim 14 wherein the controller activates the first bank after the second upstream emission control device and the second exhaust gas oxygen sensor have attained minimum desired operating temperatures, and biases air/fuel ratio rich for the second bank and lean for the first bank until the first emission control device and first exhaust gas oxygen sensor reach associated desired operating temperatures.

19. The system of claim 18 wherein the controller retards ignition timing for the first bank until the first emission control device and first exhaust gas oxygen sensor reach associated desired operating temperatures.

20. A computer readable storage medium having stored data representing instructions executable by a computer to control a variable displacement internal combustion engine having cylinders grouped into first and second banks with associated separate first and second upstream emission control devices and first and second exhaust gas oxygen sensors and at least a third downstream emission control device, at least one bank being selectively activated and deactivated to provide variable displacement, the computer readable storage medium comprising:

instructions for deactivating the first bank after starting the engine until the second upstream emission control device and the second exhaust gas oxygen sensor have attained minimum desired operating temperatures.

21. The computer readable storage medium of claim 20 further comprising instructions for retarding ignition timing for the second bank during and after starting.

22. The computer readable storage medium of claim 20 further comprising instructions for biasing air/fuel ratio lean for the second bank during and after starting.

23. The computer readable storage medium of claim 20 further comprising:

instructions for activating the first bank after the second emission control device and second exhaust gas oxygen sensor reach associated desired operating temperatures until the first emission control device and first exhaust gas oxygen sensor reach associated desired operating temperatures.

24. The computer readable storage medium of claim 21 further comprising:

instructions for activating the first bank after the second upstream emission control device and the second exhaust gas oxygen sensor have attained minimum desired operating temperatures and biasing air/fuel ratio rich for the second bank and lean for the first bank until the first emission control device and first exhaust gas oxygen sensor reach associated desired operating temperatures.

25. The computer readable storage medium of claim 24 further comprising:

instructions for retarding ignition timing for the first bank until the first emission control device and first exhaust gas oxygen sensor reach associated desired operating temperatures.

* * * * *